May 17, 1960
E. WAX ET AL
2,936,900
HOLDER FOR SUPPORTING FOOD PRODUCTS, SUCH
AS CAKES AND THE LIKE
Filed Sept. 21, 1955
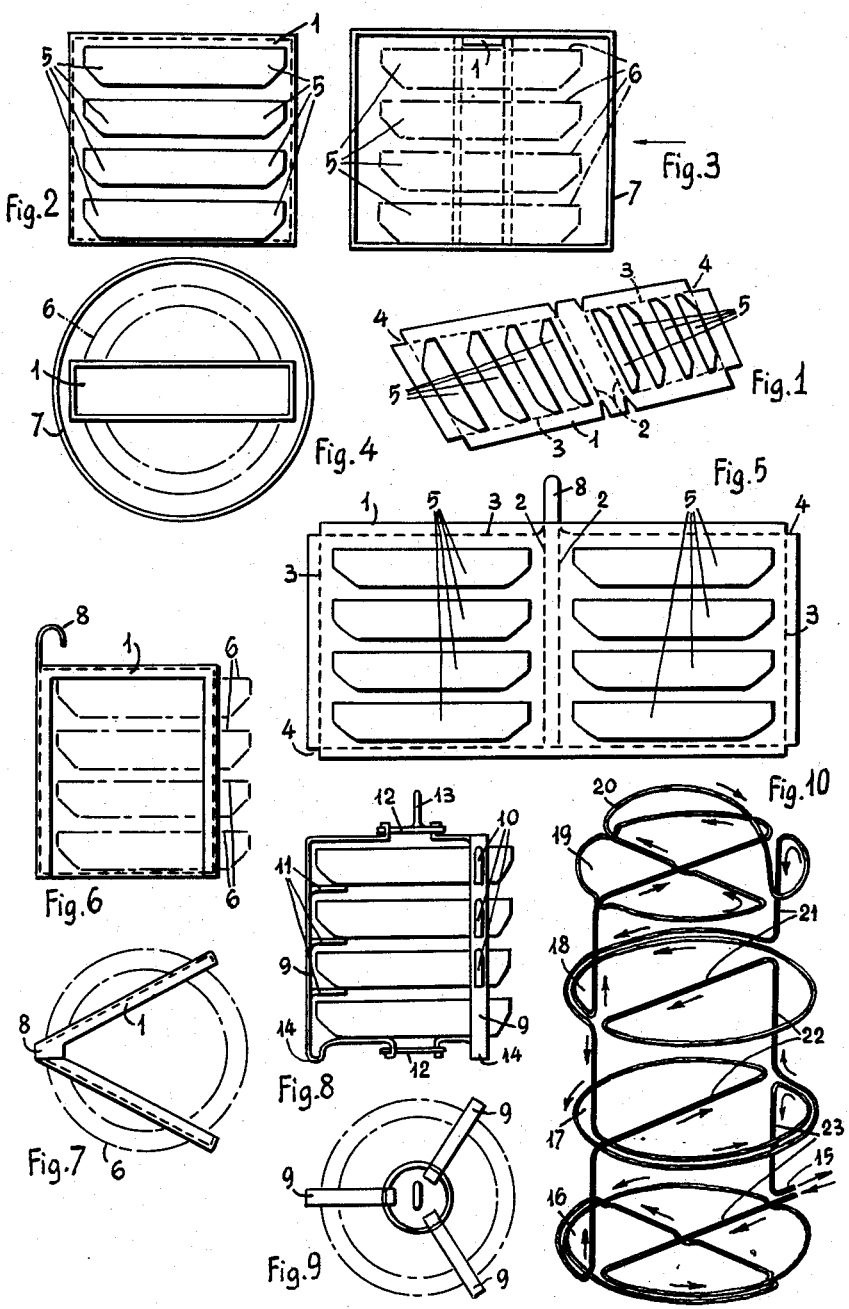

United States Patent Office 2,936,900
Patented May 17, 1960

2,936,900

HOLDER FOR SUPPORTING FOOD PRODUCTS, SUCH AS CAKES AND THE LIKE

Enrico Wax and Guido Vitale, Genoa, Italy, assignors to Società in nome Collettivo Wax & Vitale, Genoa, Italy Application September 21, 1955, Serial No. 535,696

Claims priority, application Italy June 16, 1955

3 Claims. (Cl. 211—73)

In the food production industry, and more particularly in the production of confectionery or the like, it is often required to pack food articles, such as cakes for instance, having a sugared or other soft or brittle coating, in specific spaced positions relative to each other.

It is also necessary and convenient to be able rapidly and exactly to introduce a group of food products, each disposed on a proper tray plate or the like, in a single casing or box for transportation.

The object of this invention is to support in an ordered and fixed manner food products such as confectionery or the like and thereby avoid all risk of damage.

The holder according to the invention essentially comprises a base portion and side elements formed so as to define a series of vertically spaced parallel surfaces adapted to support a plurality of trays containing food products, the trays being insertable on and removable from the said surfaces by passing them between the side elements.

The holder may be characterized by the fact that the base portion and side elements are constituted in a single piece of thin sheet material preferably of metal such as aluminium, stamped and consecutively folded in order to assume the final form desired.

The holder is, in another embodiment, characterized in that the base and side elements are formed by upright strips connected together and having inturned flanges vertically spaced so as to constitute a series of support surfaces for the trays.

The holder is in another particular embodiment, characterized in that the base, side elements and tray supports are substantially constituted by a single suitably bent and folded continuous wire.

The holder, whatever its form, may also be characterized by the provision at one of its ends of a gripping element or handle.

In the accompanying drawings some particular forms, such as those referred to above, are shown. In these drawings:

Figure 1 is a perspective view of a strip of sheet material showing the mode of formation of one embodiment;

Figures 2, 3 and 4 are respectively, side and end elevations and a plan view of the embodiment of Figure 1 after a folding operation;

Fgures 5, 6 and 7 are corresponding views of a second embodiment;

Figures 8 and 9 are respectively a side elevation and a plan view of a third embodiment; and Figure 10 is a perspective view of a fourth embodiment constituted by a single continuous length of wire.

Referring now to Figures 1 to 4 there is shown a thin sheet 1 on which fold lines 2 and 3 have been impressed by a stamping operation and having cut away corners 4 and a series of parallel slots 5. The two halves of the sheet are now folded parallel to one another about the fold lines 2 to form side walls separated by an intervening spacing portion lying between fold lines 2 and the longitudinal edges of the sheet are turned upwardly and inwardly by folding about the fold lines 3, the sheet then having the form shown in Figure 2. The thus folded sheet is self-sustaining and it is not necessary to provide special means to hold the sides together or to join the inturned edges of the sheet. As shown in Figures 3 and 4 in use small trays 6 made for instance of thin aluminium foil and containing a food product such as cakes are each supported in and by a pair of the now opposed and equidistant slots or cut-outs 5 which have lower edges adapted to engage and support said trays. The bottom edge portions of the side walls are suitably bent inwardly along the fold lines indicated by broken lines in Fig. 1 to form a base portion for the holder. A casing 7 which is suitably a tubular drum or the like as shown in Figure 4 contains the whole assembly.

An alternative form of supporting device is shown in Figures 5, 6 and 7 wherein similar reference numerals indicate parts equivalent to those already referred to. In this device the halves of the plate instead of being parallel are folded about the lines 2 to define an acute angle. Also an integral or subsequently attached strip 8 suitably bent over acts as a handle enabling the device to be readily gripped and handled. The mode of use of this form of the device is exactly similar to that first described.

In the embodiment shown in Figures 8 and 9 each of three side members 9 is constituted by a thin and narrow strip having openings 10 from the lowermost ends of which there extend at right angles a series of supports or flanges 11 for supporting the trays 6. At the top and at the bottom of the device the three side members 9 are folded inwardly at right angles to form flanges and have their ends bent or folded through engraved discs 12. A handle 13 is fixed to the top disc 12 and, as shown, the curvature of the bottom of the side members 9 is such as to constitute small supporting feet 14.

The mode of use of this particular device is the same as already described for the preceding embodiments.

In the embodiment shown in Figure 10 the trays 6 are supported by a continuous wire structure originating at point 15 and following the path indicated by the arrows. The wire forms without any interruption four support rings 16 to 19, a handle 20 and three rectangles 21, 22 and 23, which together with the vertical side members keep the rings 16 to 19 in spaced relation and co-operate with the horizontal portions of the small trays which have the said rings. In the figure some portions of the wire are shown as double and the wire at the crossing points is shown only for an illustrative purpose, as separated, but the latter must be considered tightly adherent and if possible actually twisted together.

Although the invention has been described by reference to several particular forms of holder it should be appreciated that various modifications and additions could be made to the holder always within the scope of the appended claims.

What we claim is:

1. A holder adapted to be placed into and removed from a container and adapted for releasably supporting in said container a plurality of superposed trays for cakes, pies and like circular delicate food product units, which comprises a single integral metal sheet element having a base portion, a pair of opposite laterally spaced-apart side walls integral with said base portion, and an integral means integral with said walls and maintaining the spaced-apart relationship of said walls, said walls being formed with a plurality of vertically spaced-apart cut-outs with the cut-outs in one wall matching the cut-outs of the other wall to define pairs of cooperating cut-outs, said cut-outs being dimensioned to receive said plurality of trays in vertically superposed spaced relationship with a single tray being receivable through each pair of said cut-outs, said trays being freely insertable into said holder and being removable therefrom by sliding movement in planes perpendicular to the planes of said side walls, and the bottoms of the said trays being engaged by the lower edges of said cut-outs and being wholly supported thereby, said cut-outs extending across a major portion of the width of said side walls whereby when said trays are disposed in said cut-outs said side walls extend only slightly beyond the peripheries of said trays.

2. A holder adapted to be placed into and removed from a container and adapted for releasably supporting in said container a plurality of superposed trays for cakes, pies and like circular delicate food product units, which comprises a single integral aluminum sheet element having a base portion, a pair of substantially parallel opposite laterally spaced-apart walls integral with said base portion and integral with said walls a spacing portion maintaining the spaced-apart relationship of said walls, said walls alone being formed with a plurality of vertically spaced-apart cut-outs with the cut-outs in one wall matching the cut-outs of the other wall to define pairs of cooperating cut-outs, said cut-outs being dimensioned to receive said plurality of trays in vertically superposed spaced relationship with a single tray being receivable through each pair of said cut-outs, said trays being freely insertable into said holder and being removable therefrom by sliding movement in planes perpendicular to the planes of said side walls, and the bottoms of said trays being engaged by the lower edges of said cut-outs and being wholly supported thereby, said cut-outs extending across a major portion of the width of said side walls whereby when said trays are disposed in said cut-outs said side walls extend only slightly beyond the peripheries of said trays.

3. In combination with a cylindrical container a holder adapted to be placed into and removed from said container and adapted for releasably supporting in said container a plurality of superposed trays for cakes, pies and like circular delicate food product units, which comprises a single integral aluminum sheet element having a base portion, a pair of opposite laterally spaced-apart side walls integral with said base portion, integral with said walls, and an integral means maintaining the spaced-apart relationship of said walls, said walls being formed with a plurality of vertically spaced-apart cut-outs with the cut-outs in one wall matching the cut-outs of the other wall to define pairs of cooperating cut-outs, said cut-outs being dimensioned to receive said plurality of trays in vertically superposed spaced relationship with a single tray being receivable through each pair of said cut-outs, said trays being freely insertable into said holder and being removable therefrom by sliding movement in planes perpendicular to the planes of said side walls, and the bottoms of said trays being engaged by the lower edges of said cut-outs, and integral handle means extending from the upper portion of said holder and being wholly supported thereby, said cut-outs extending across a major portion of the width of said side walls whereby when said trays are disposed in said cut-outs said side walls extend only slightly beyond the peripheries of said trays.

References Cited in the file of this patent

UNITED STATES PATENTS

| | | |
|---|---|---|
| D. 150,797 | Lane | Aug. 31, 1948 |
| 1,640,452 | Knowlton | Aug. 30, 1927 |
| 1,687,138 | Myers | Oct. 9, 1928 |
| 1,752,655 | Scherotto | Apr. 1, 1930 |
| 1,946,779 | Conway | Feb. 13, 1934 |
| 2,267,378 | Snelling | Dec. 23, 1941 |
| 2,420,940 | Eldridge | May 20, 1947 |
| 2,478,458 | Carter | Aug. 9, 1949 |
| 2,627,981 | Bitney | Feb. 10, 1953 |

FOREIGN PATENTS

| | | |
|---|---|---|
| 155,044 | Great Britain | Dec. 16, 1920 |